Oct. 10, 1944.  W. C. ANTHONY  2,359,961

HOIST

Filed April 9, 1942

Inventor
William C. Anthony
by Parker & Carter
Attorneys.

Patented Oct. 10, 1944

2,359,961

UNITED STATES PATENT OFFICE 2,359,961

HOIST

William C. Anthony, Streator, Ill., assignor to Anthony Company, Streator, Ill., a corporation of Illinois Application April 9, 1942, Serial No. 438,255

5 Claims. (Cl. 254—2)

This invention relates to a raising or hoisting means by which a platform receptacle or other member may be raised. It has for one object to provide automatic means for controlling the raising mechanism to hold it level. One object is, therefore, to provide a raising mechanism and to associate with that raising mechanism automatic level maintaining means.

While the mechanism of this invention may be embodied in a hoist or raising means, it may also be associated with a vehicle, automotive or otherwise, and so arranged as to operate on that mechanism and to maintain the member which is raised level, irrespective of the position of the vehicle, so that if the vehicle is not level, the mechanism will still be so operated as to maintain the member which is raised level.

Another object is to provide in connection with an automotive vehicle a raising platform or receptacle and means for raising it and for maintaining it level during raising.

Other objects will appear from time to time throughout the specification and claims.

This invention is illustrated more or less diagrammatically in the accompanying drawing, wherein.

Like parts are indicated by like characters throughout the specification and the drawing.

Figure 1:
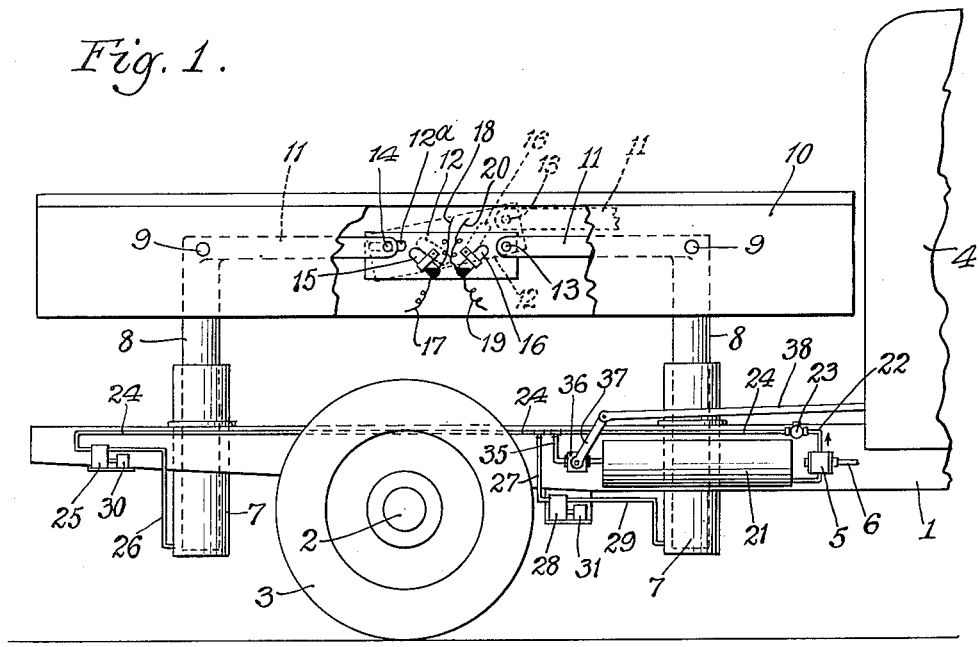
Figure 1 is a side elevation with parts broken away and parts omitted, showing the raising means mounted on a truck or other automotive vehicle.

As shown in Figure 1, the invention is assembled on or embodied in an automotive truck which comprises a frame 1, an axle 2, wheels 3, and a cab 4. These parts are shown merely diagrammatically, as their details form no essential part of the invention. Ordinarily, a vehicle of this sort will have an engine and means for taking off power from the engine to drive auxiliary parts.

In the present embodiment of the invention a rotary pump 5 is driven by a shaft 6 which may be connected to the power take-off of the engine by any convenient means with or without a clutch.

Two hydraulic cylinders 7, 7 are mounted on the truck and may be positioned on its center line one behind the other. In each a piston is mounted which is not shown, but which is connected to a piston rod 8. The piston rods are pivotally connected as at 9 to a platform assembly 10. Rigidly fixed with relation to each piston rod is a lever arm 11, 11. Mounted on the free ends of the arms 11 is a switch carrying means 12. As shown, it is pivoted to the forward arm 11 as at 13 and it is pivoted to the rearward arm 11 as at 14. The plate or member 12 is itself slotted as at 12a to engage the pivot member 14. A pair of electric switches 15, 16 is fixed upon the member 12 and each is provided with electrical conductors. The switch 15 is provided with conductors 17 and 18, and the switch 16 is provided with conductors 19 and 20. The connections and operation of the circuit will be described below. Means are provided for furnishing fluid under pressure to each of the cylinders 7 in order to raise each of the pistons, and the piston rods 8. This hydraulic system includes the pump 5 and may include a sump or storage member 21. A pipe or conduit 22 leads from the discharge side of the pump 5 and may be provided with a check valve 23 of any desired type. From the check valve 23 runs a conduit 24. The conduit 24 is connected to a valve 25 from which a conduit 26 leads to the rear-most cylinder 7. A conduit 27 leads from the conduit 24 to a valve 28, which by means of a conduit 29 is connected to the forward cylinder 7. Each of the valves 25 and 28 is arranged to be operated by a solenoid, the solenoid 30 being arranged to operate the valve 25, and the solenoid 31 being arranged to operate the valve 28. Each of the switches 15 and 16 is connected to one of the solenoids. The conductor 17 is connected to one pole of the solenoid 31 and a wire 32 runs from the other pole of the solenoid 31 to a conductor 33 which is connected with any suitable source of current. The conductor 18 of the switch 15 is joined to a conductor 34 which is also connected to a source of current.

Figure 2:
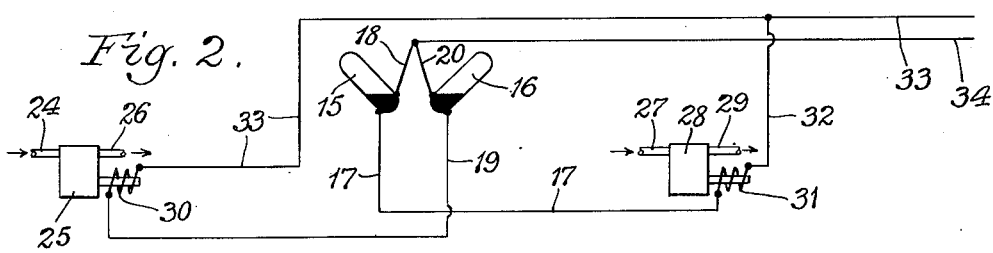
Figure 2 is a schematic diagram of the electrical circuit for the level maintaining means.

The conductor 19 leads from the switch 16 to one pole of the solenoid 30 and the other pole of the solenoid is connected to the conductor or wire 33. The switch 16 is also connected by a wire or conductor 20 to the conductor 34. Thus each of the switches is connected to a source of current and arranged to control the operation of one of the solenoids. As shown in Figure 2, the left hand switch 15 controls the right hand solenoid 31, and the right hand switch 16 controls the left hand solenoid 30.

A return pipe or conduit 35 is connected to the conduit 24, and by means of a valve contained in the housing 36 can be operated to permit the return flow of the fluid into the sump 21 when desired. A lever or handle 37 is connected to the valve, and by means of it the valve may be operated. A connecting member 38 leads from the valve handle 37 to the cab or any other suitable point from which the valve may be operated.

Figure 3:
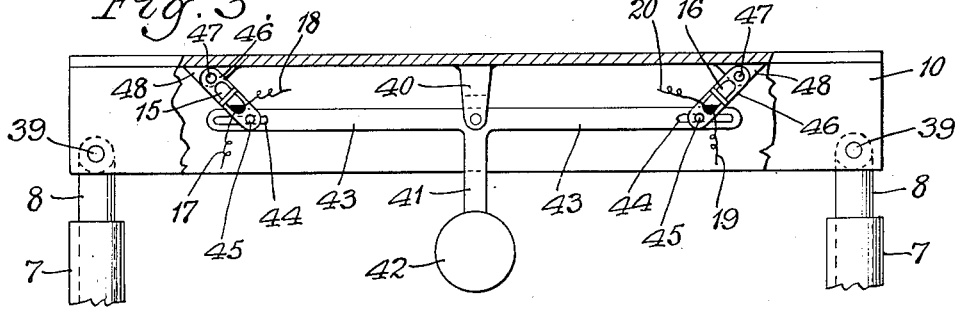
Figure 3 is a fragmentary view generally like Figure 1, with parts omitted and parts in section, illustrating a modified form of leveling mechanism.

In the modified form of Figure 3 the cylinders 7 and the piston rods 8 and the platform 10 are as shown in the first figure. Each of the piston rods 8 is pivotally connected to the platform 10, as at 39, 39. The leveling means of Figure 3 comprises a pivotal support 40 upon which a pendulum 41 is mounted. The pendulum may include a weight 42. The pendulum is also provided with two oppositely extending arms 43, 43. Each arm is slotted as at 44 and is connected by a pin 45 or otherwise to a movably mounted switch carrier 46. Each switch carrier is pivotally mounted as at 47 upon a base or support 48 which is mounted upon or is in fixed relation to the platform 10. Each of the switch carriers 46 has mounted upon it a switch which is preferably identical with the switches shown in Figures 1 and 2. For that reason the same numerals of reference are positioned upon the switches and the wires or conductors as shown in all figures. Thus the left hand carrier 46 has mounted upon it the switch 15, and the right hand carrier 46 has mounted upon it the switch 16. The wiring circuit and electrical parts generally are preferably the same in each embodiment of the invention, and therefore are not redescribed in connection with Figure 3.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing.

In particular, the exact mounting of the piston rods on the platform or container may be varied widely so long as the container or platform is movably mounted upon the piston rods. When operation takes place, if the piston rods are fastened rigidly to the platform, the movement which accomplishes leveling could not occur, and hence some movable connection between the piston rods and the platform is necessary. The exact means of mounting and supporting the switches may be varied widely, so long as the switches are carried upon a member or members which will be tilted or moved sufficiently to cause the switches to be actuated in the event that the platform or container moves or is raised into a position other than level. The particular details of the hydraulic assembly may be varied. The exact arrangement of pump, sump, and return means may be varied, so long as some form of hydraulic hoisting means is used. No particular means are shown for furnishing electrical current to the switches to operate them and the solenoids. Any desired source of electricity may be used. Ordinarily when the device is mounted on a truck or other automotive vehicle, a source of current is available from the battery and that source may be used to actuate the switches and the solenoids. If desired, a separate and independent source may be used, and preferably a master switch is provided in the electrical circuit so that when desired the whole system may be made inactive. Obviously no useful purpose is served by actuating the solenoids at a time when the platform is stationary, and no raising is to occur.

The use and operation of the invention are as follows:

As shown in Figure 1, for example, the device of this invention is mounted upon a motor truck driven by an internal combustion engine, although it might be driven by other means such as steam and electricity.

Assuming now that the truck is on a level road or surface and that the platform is in the lowered position, and it is desired to raise it, the valves 25 and 28 will ordinarily be opened. The valves may be provided with springs biased to close them when free to do so, and the solenoids will be operated to open the valves. With the arrangement shown when the platform is level, a circuit is completed through each of the switches, and therefore each of the solenoids is actuated and each of the valves is held open. As pressure fluid is forced from the pump through the conduits into the cylinders, each piston rises and under some conditions they will rise equally and leveling will be mantained. When it is desired to lower the platform, the pump may be stopped and the valve handle 37 is operated to open the valve in the housing 36, and the weight of the pistons, the platform, and possibly its load, will operate to force the fluid from the cylinders back through the conduits and into the sump.

Experience has shown that the cylinders will rarely operate completely in balance. One will generally lead the other, and when that occurs, one of the pistons moves more rapidly than the other and the platform is tipped. If either of the pistons moves ahead of the other, the switch carrier 12 will be tilted and one of the switches will be moved so that the circuit through it is broken. When that occurs, the solenoid which it controls will cease to operate and the spring in the valve associated with that solenoid is then free to close the valve, and of course so long as this valve remains closed, no further pressure fluid is supplied to its cylinder, and hence the piston does not move. Thus the other piston is given a chance to catch up to the first piston, which had been leading. When it does so, the carrier 12 is again brought to a level position, and the switch which had been broken is again moved to the position in which a circuit through it is completed, and thereupon it actuates its solenoid which opens the valve and pressure fluid is then supplied to both of the cylinders. This operation will occur as often as either of the pistons moves too rapidly. If it be assumed that the front piston rod 8 moves too rapidly, so that it leads the rear piston rod 8, the switch carrier 12 will be tilted, having its right hand end as shown in Figure 1 raised, and that will break the circuit in the switch 15, the solenoid 31 ceases to operate, and the valve 28 closes, so that the forward piston rod 8 no longer rises, and the rear piston rod 8 has a chance to catch up to it. When it does so, the carrier 12 is again brought to the level position, a circuit is completed through the switch 15, the solenoid 31 is actuated, and valve 28 is again opened and pressure fluid is then again equally supplied to both cylinders. This operation occurs of course equally with respect to the other cylinder switch, and valve assembly, and will occur whenever unbalance occurs.

The operation of the form of Figure 3 is substantially like that described above. Should the parts be in a level condition and remain so, no movement of the pendulum 41 will occur. Should the right hand piston rod 8 as shown in Figure 3 move more rapidly than the other piston rod, the lower end of the switch 15 will be tilted upwardly about the pivot 47, and the circuit through that switch will be broken as above described, in connection with Figure 1, and that will operate the solenoid to permit the valve which controls the movement of the pressure fluid to the right hand cylinder 7 to close, and the cycle of this operation is the same as the cycle above described, the weight on the pendulum being effective to maintain the arms 43 horizontal no matter what the tilting movement of the platform 10 may be, and thus tilting one or the other of the switches 15 and 16.

Should it happen that the truck is on an unlevel surface when raising is to occur, the cycle of operation above described will be carried out. In the form of Figure 1, if the truck is sufficiently tilted even before any movement of the pistons occurs, one or another of the switches 15 or 16 may be sufficiently tilted by the position of the truck alone to break the circuit through it and therefore when raising starts, one valve will remain closed until the piston which is at that time the lower has moved sufficiently to restore the platform 10 to a level and then the operations above described will occur, and both valves will open and the platform will move upwardly in a level condition.

Should the form of Figure 3 be embodied in a truck which is not level when raising is to occur the pendulum 41 and the weight 42 will of course have tilted the switches sufficiently to move one of them out of circuit, and therefore to hold one of the pistons stationary until the platform 10 has moved to the level position, and then the pendulum is effective to restore both switches to the position in which each of them actuates its solenoid to maintain its valve open.

I claim:

1. In combination, an automotive vehicle including a support and a movable load carrying carriage positioned thereon, means for raising said carriage with respect to said support, said means including a plurality of hydraulic lifting assemblies fixedly positioned along the center line of said support from front to rear, and means for supplying fluid under pressure to said assemblies, and automatic level responsive means for controlling the supply of such fluid to said assemblies, said means comprising a plurality of electric switches tiltably supported from said carriage, and switch carrying means carrying all of said switches and movably supported from said carriage for movement with respect to the carriage itself, and means responsive to unequal movement of said pistons for operating said switches.

2. In combination, a single support having rotary ground-contacting members, whereby it is moved with relation to the ground, a single load carrying member movably mounted upon said single support, and means for moving it with respect to said support, said means including a plurality of hydraulic assemblies fixed upon said single support, arranged to carry and to move said load carrying member, and means rigidly holding said hydraulic means against relative horizontal movement with respect to each other, and means for supplying pressure fluid to said assemblies, said means including a source of fluid and means for moving said fluid, and conduits from said fluid moving means to each of said assemblies, and valves in said conduits adapted to control movement therethrough, and electrical means arranged one for each of said valves and adapted to operate its said valve, level responsive means for automatically controlling said electrical valve operating means, said electrical means being supported from said single load carrying member to swing with respect thereto, whereby when the latter moves out of the horizontal, one of said electrical means is actuated to effect one of said electrical valve operating means, and thereby to effect its valve and to alter the flow of pressure fluid to one of said assemblies and to maintain this alteration until the load carrying member has returned to the horizontal position.

3. In combination, an automotive vehicle including a support and a movable load-carrying carriage positioned thereon, means for raising said carriage with respect to said support, said means including a plurality of hydraulic lifting assemblies, and means for supplying fluid under pressure to said assemblies, and automatic level responsive means for controlling the supply of such fluid to said assemblies, said means comprising members rigidly connected to parts of each of said hydraulic lifting assemblies, and a member movably connected to each of such rigid members, and a plurality of electrical switches positioned on said last-mentioned member.

4. In combination, an automotive vehicle including a support and a movable load-carrying carriage positioned thereon, means for raising said carriage with respect to said support, said means including a plurality of hydraulic lifting assemblies, and means for supplying fluid under pressure to said assemblies, and automatic level responsive means for controlling the supply of such fluid to said assemblies, said means comprising a plurality of electrical switches, each pivoted upon said carriage, and a pendulum pivoted upon the carriage, and a plurality of extensions from said pendulum, each movably connected to one end of one of said electric switches.

5. In combination, a single support; means for movably carrying said single support along the ground; a load carrying member mounted upon said support for raising and lowering with respect thereto and wholly carried thereby; and means for raising and lowering said load carrying member with respect to said single support, said means including a plurality of hydraulic assemblies fixed upon said support and held thereby against relative horizontal movement with respect to each other and arranged to raise and to lower said load carrying member; means for supplying pressure fluid to said assemblies including a source of fluid and means for moving said fluid, and conduits from said fluid moving means to each of said assemblies, valves in said conduits adapted to control movement of fluid therethrough; and level responsive means carried wholly by said load carrying member and adapted to operate said valves for automatically controlling the level of said load carrying member, said level responsive means including a movable member mounted for bodily movement with respect to said load carrying member and a plurality of electric switches, one for each of said valves, said switches being movably supported from said load carrying member and being actuated by said movable member in such manner that when the load carrying member moves out of the horizontal, one of said switches is actuated by said movable member to effect one of said valves to alter the flow of pressure fluid to one of said assemblies and to maintain this alteration until the load carrying member has returned to the horizontal position.

WILLIAM C. ANTHONY.